(12) United States Patent
Deville

(10) Patent No.: US 8,048,828 B2
(45) Date of Patent: Nov. 1, 2011

(54) SPOTTING FLUID COMPOSITIONS AND ASSOCIATED METHODS

(75) Inventor: Jay P. Deville, Houston, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 1155 days.

(21) Appl. No.: 11/037,402

(22) Filed: Jan. 18, 2005

(65) Prior Publication Data

US 2006/0160705 A1 Jul. 20, 2006

(51) Int. Cl.
C09K 8/035 (2006.01)
C09K 8/36 (2006.01)
E21B 31/03 (2006.01)

(52) U.S. Cl. ............... 507/136; 166/301; 166/244.1; 507/100; 507/103; 516/9; 516/20; 516/21; 516/28; 516/30

(58) Field of Classification Search .............. 507/136, 507/100, 103; 166/301, 244.1; 516/30, 9, 516/20, 21, 28

See application file for complete search history.

(56) References Cited

U.S. PATENT DOCUMENTS

| | | | |
|---|---|---|---|
| 3,217,802 A | 11/1965 | Reddie et al. | 166/44 |
| 3,547,852 A * | 12/1970 | Burke, Jr. | 524/320 |
| 4,427,564 A | 1/1984 | Brownawell et al. | 252/8.55 R |
| 4,436,638 A | 3/1984 | Walker et al. | 252/8.55 R |
| 4,464,269 A | 8/1984 | Walker et al. | 252/8.55 R |
| 4,614,235 A | 9/1986 | Keener et al. | 166/301 |
| 4,964,615 A | 10/1990 | Mueller et al. | 252/8.551 |
| 5,045,219 A | 9/1991 | Trahan et al. | 252/8.51 |
| H1000 H | 12/1991 | Patel et al. | 507/103 |
| 5,141,920 A | 8/1992 | Bland et al. | 507/136 |
| 5,260,268 A | 11/1993 | Forsberg et al. | 507/133 |
| 5,945,386 A | 8/1999 | Alonso-DeBolt et al. | 507/136 |
| 6,063,146 A | 5/2000 | Miller et al. | |
| 6,267,186 B1 | 7/2001 | Hayatdavoudi | 175/64 |
| 6,315,042 B1 | 11/2001 | Griffith et al. | 166/291 |
| 6,326,514 B1 | 12/2001 | Klug et al. | |
| 6,410,488 B1 | 6/2002 | Fefer et al. | 507/103 |
| 6,435,276 B1 | 8/2002 | Kercheville et al. | 166/255.1 |
| 6,524,384 B2 | 2/2003 | Griffith et al. | 106/705 |
| 6,662,871 B2 | 12/2003 | Kercheville et al. | 166/255.1 |
| 6,668,929 B2 | 12/2003 | Griffith et al. | 166/292 |
| 6,793,025 B2 | 9/2004 | Patel et al. | 175/50 |
| 2001/0016561 A1 | 8/2001 | Hayatdavoudi | 507/100 |
| 2002/0125013 A1 | 9/2002 | Kercheville et al. | 166/301 |
| 2002/0148609 A1 | 10/2002 | Kercheville et al. | |
| 2003/0121456 A1 | 7/2003 | Griffith et al. | |
| 2003/0121660 A1 | 7/2003 | Griffith et al. | 166/292 |
| 2003/0130135 A1 | 7/2003 | Hou et al. | 507/200 |
| 2003/0220204 A1 * | 11/2003 | Baran et al. | 507/200 |
| 2004/0072697 A1 | 4/2004 | Kercheville et al. | 507/100 |
| 2006/0160706 A1 | 7/2006 | Deville | 507/261 |
| 2007/0049500 A1 * | 3/2007 | Mueller et al. | 507/136 |

FOREIGN PATENT DOCUMENTS

| | | |
|---|---|---|
| EP | 1496096 | 1/2005 |
| WO | WO 00/47690 | 8/2000 |
| WO | WO 2005/012455 A | 2/2005 |
| WO | WO 2006077372 | 8/2006 |
| WO | WO 2006087505 | 8/2006 |

OTHER PUBLICATIONS

Baroid brochure entitled "AQUAGEL® Viscosifier" dated 2004.
Baroid brochure entitled "AQUAGERL GOLD SEAL® Viscosifier" dated 2004.
Baroid brochure entitled "BARACTIVE™ Polar Activator" dated 2002.
Baroid brochure entitled "BARARESIN®-VIS Viscosifier" dated 2000.
Baroid brochure entitled "BARAVIS® Viscosifier" dated 2000.
Baroid brochure entitled "BARAWEIGHT™ Weighting Material" dated 2002.
Baroid brochure entitled "BARAZAN® Viscosifier/Suspension Agent" dated 2000.
Baroid brochure entitled "BARAZAN® D Viscosifier/Suspension Agent" dated 2000.
Baroid brochure entitled "BARAZAN® D Plus Viscosifier/Suspension Agent" dated 2001.
Baroid brochure entitled "BARAZAN® L Viscosifier/Suspension Agent" dated 2001.
Baroid brochure entitled "BARAZAN® Plus Viscosifier/Suspension Agent" dated 2000.
Baroid brochure entitled "BARODENSE® Weighting Material" dated 2000.
Baroid brochure entitled "BROMI-VIS® Liquid Viscosifier" dated 2000.
Baroid brochure entitled "CON DET® Wetting Agent" dated 2000.
Baroid brochure entitled "DRILTREAT® Oil Wetting Agent" dated 2000.
Baroid brochure entitled "EZ SPOT™ Spotting Fluid" dated 2003.
Baroid brochure entitled "GELTONE® Viscosifier" dated 2002.
Baroid brochure entitled "GELTONE® II Viscosifier" dated 2002.
Baroid brochure entitled "GELTONE® V Viscosifier" dated 2002.
Baroid brochure entitled "GELTONE® IV Viscosifier" dated 2002.

(Continued)

Primary Examiner — T. J. Kugel
(74) Attorney, Agent, or Firm — Craig W. Roddy; Baker Botts LLP

(57) ABSTRACT

Fluids and associated methods useful in subterranean applications are provided. More particularly, methods of reducing drill string sticking are provided, which include: providing a spotting fluid composition comprising a water insoluble external phase fluid, a water soluble internal phase fluid, and an ether carboxylic acid emulsifying agent; introducing the spotting fluid to the vicinity of a desired portion of a drill string; and allowing the spotting fluid to interact with a portion of material surrounding the desired portion of the drill string spotting fluid. Compositions are provided that may be useful in subterranean applications for addressing, among other things, drill string sticking problems. Additional optional components may be used, such as viscosifiers, weighting agents, and wetting agents.

20 Claims, No Drawings

OTHER PUBLICATIONS

Baroid brochure entitled "LIQUI-VIS® EP" dated 2002.
Baroid brochure entitled "LIQUI-DRIL™ ROP Enhancer" dated 2002.
Baroid brochure entitled "MUD GEL®" dated 2002.
Baroid brochure entitled "N-VIS™ HB" dated 2002.
Baroid brochure entitled "N-VIS™ P Plus Viscosifier" dated 2002.
Baroid brochure entitled N-VIS™ O Viscosifier dated 2002.
Baroid brochure entitled "QUIK-FREE™ Spotting Fluid" dated 2002.
Baroid brochure entitled QUIK-FREE™ Spotting Fluid, Time is on your side with QUIK-FREE Spotting Fluid dated 2003.
Baroid brochure entitled "XLR-RATE™ ROP Enhancer" dated 2002.
Baroid brochure entitled ZEOGEL® Viscosifier, dated 2002.
Foreign communication from a related counterpart application dated Mar. 17, 2006.
Office Action from U.S. Appl. No. 11/037,690 dated Aug. 10, 2007.
Office Action from U.S. Appl. No. 11/037,690, Feb. 19, 2008.
Foreign Search Report from PCT/GB2005/005101, Feb. 8, 2008.
Foreign Search Report from EP 05 823 714, Nov. 22, 2007.
Foreign Search Report from PCT/GB2005/005099, Jul. 24, 2007.
Office Action for U.S. Appl. No. 11/037,690, dated Feb. 3, 2009.
Office Action mailed Jul. 11, 2008, for U.S. Appl. No. 11/037,690.

\* cited by examiner

SPOTTING FLUID COMPOSITIONS AND ASSOCIATED METHODS

BACKGROUND

The present invention relates to fluids useful in subterranean applications and more particularly, to spotting fluid compositions that may be useful in subterranean applications for addressing, inter alia, drill string sticking problems.

Drill string sticking is a phenomenon in which a drill string or a portion of a drill string cannot be moved within a well bore. That is, a drill string or a portion of a drill string may experience sticking such that it cannot be rotated, reciprocated, or both. Drill string sticking is generally considered the most expensive and greatest lost-time problem in drilling.

Traditionally, the main types of drill string sticking are differential sticking and mechanical sticking. Differential sticking usually occurs when a drill string becomes embedded in, among other things, the filter cake contained within a subterranean formation, e.g., a permeable formation. A drill string can be become stuck in a well bore (e.g., in the filter cake) by a pressure differential between the hydrostatic pressure of the well bore mud and the formation pressure. This difference in pressures is sometimes referred to as "overbalance pressure." The sticking force exerted on a drill string can be considerable when the overbalance pressure is exerted over a large portion of the drill string. Inadequate fluid-loss control, poor filter-cake characteristics, excessive solids content, and high overbalance pressures can exacerbate filter cake thickness and the severity of the problem. Mechanical sticking can be caused by, among other reasons, key seating, inadequate hole cleaning, well bore instability, and/or undergauge hole.

Methods used to alleviate a stuck portion of a drill string have included methods such as lowering the hydrostatic pressure in a well bore, applying a shock force just above the stuck point by mechanical jarring, placing a spotting fluid next to the stuck zone, or some combination of the above. Lowering the hydrostatic pressure of the well bore to free stuck pipe is one alternative, but this solution has drawbacks in that it may compromise well control. In many cases, application of a shock force to the pipe does not suffice to free the stuck pipe. Therefore, quick application of a spotting fluid is usually recommended as a solution for freeing stuck pipe. Indeed, the most common approach is to place a spot of oil, oil-base mud, or special spotting fluid in the stuck zone of drill string. Spotting fluids may act to assist in reducing the differential sticking problem encountered by drill strings by, among other things, acting as a lubricant and/or by dehydrating the filter cake formed around the stuck portion of the drill string.

A variety of spotting fluids have been heretofore used to address the problem of stuck pipe. One of the drawbacks of some of the spotting fluids heretofore used is that certain components of the spotting fluid may not be compatible with higher environmental standards of some regions. As one example of this problem, some spotting fluids use emulsifying agents that are not compatible with stricter environmental regulations of the North Sea region or other regions. Consequently, operators in some regions may have to resort to using less desirable spotting fluids that may be less effective or forego the use of spotting fluids entirely.

SUMMARY

The present invention relates to fluids useful in subterranean applications and more particularly, to spotting fluid compositions that may be useful in subterranean applications for addressing, inter alia, drill string sticking problems.

An example of a method of reducing drill string sticking comprises: providing a spotting fluid composition comprising a water insoluble external phase fluid, a water soluble internal phase fluid, and an ether carboxylic acid emulsifying agent; introducing the spotting fluid to the vicinity of a desired portion of a drill string; and allowing the spotting fluid to interact with a portion of material surrounding the desired portion of the drill string.

Another example of a method of reducing differential sticking of a drill string comprises: providing a spotting fluid composition comprising an emulsion formed by the reaction product of a water insoluble external phase fluid wherein the water insoluble external phase fluid comprises isobutyl oleate, a water soluble internal phase fluid wherein the water soluble internal phase fluid comprises glycerin, an ether carboxylic acid emulsifying agent wherein the ether carboxylic acid is defined by the following formula:

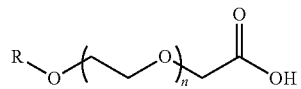

where n is a positive integer: $1 \leq n \leq 8$, and where R is any hydrocarbon group having from about 1 to about 30 carbon atoms; introducing the spotting fluid composition to the vicinity of a desired portion of a drill string; and allowing the spotting fluid to interact with a portion of material surrounding a desired portion of the drill string.

Another example of a method of reducing differential sticking of a drill string comprises: providing a spotting fluid comprising a water insoluble external phase fluid wherein the water insoluble external phase fluid comprises isobutyl oleate, a water soluble internal phase fluid wherein the water soluble internal phase fluid comprises glycerin, an ether carboxylic acid emulsifying agent wherein the ether carboxylic acid is defined by the following formula:

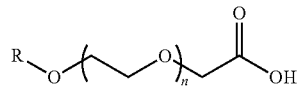

where n is a positive integer: $1 \leq n \leq 8$, and where R is $C_{18}H_q$, where q is an integer: $0 \leq q \leq 38$, a viscosifier wherein the viscosifier comprises organophilic clay, a weighting agent wherein the weighting agent comprises barite, and a wetting agent wherein the wetting agent comprises lecithin; introducing the spotting fluid composition to the vicinity of a desired portion of a drill string; and allowing the spotting fluid to interact with a portion of material surrounding a desired portion of the drill string.

The objects, features, and advantages of the present invention will be readily apparent to those skilled in the art upon a reading of the description of preferred embodiments which follows.

DESCRIPTION

The present invention relates to fluids useful in subterranean applications and more particularly, to spotting fluid compositions that may be useful in subterranean applications for addressing, inter alia, drill string sticking problems. In certain embodiments, the compositions and methods of the present invention may be particularly useful for use as spotting fluids for addressing drill string sticking problems. Moreover, the spotting fluid compositions of the present invention have desirable rheological and environmental properties for performing such operations. The spotting fluid compositions of the present invention may act to assist in reducing the differential sticking problem encountered by drill strings by, among other things, acting as a lubricant and/or by dehydrating the filter cake formed around the stuck device. As used herein, the term drill string includes, but is not limited to, drill pipes, drill collars, drill bits, stabilizers, reamers, casing, tubing, and other tools which may experience sticking problems down hole.

The spotting fluid compositions of the present invention comprise a water insoluble external phase fluid, a water soluble internal phase fluid, and an ether carboxylic acid emulsifying agent. The water soluble internal phase fluid may form an emulsion with the water insoluble external phase fluid with the ether carboxylic acid emulsifying agent. In this emulsion, a water insoluble external phase fluid may form a continuous phase surrounding a dispersed water soluble internal phase fluid. Components that may optionally be added to the spotting fluid composition include, but are not limited to, viscosifiers, weighting agents, wetting agents, or a mixture thereof.

In certain embodiments, the water insoluble external phase fluid may comprise any oleaginous fluid normally immiscible with water. Examples of water insoluble external phase fluids include, but are not limited to, fatty acid esters, mineral oil, linear alpha olefins, internal olefins, n-paraffins, diesel oil, kerosene, or a mixture thereof. Generally, the water insoluble external phase fluid preferably remains in a liquid and nonvolatile state throughout its use. Examples of fatty acid esters useful in the present invention include, but are not limited to, fatty acid esters of the formula, ROR', where R represents fatty acids of carbon chains from $C_8$ to $C_{20}$ and R' is any $C_1$ to $C_{18}$ carbon chain, such as for example, methyl oleate, ethyl oleate, isobutyl oleate, isobutyl linoleate, and isobutyl linolenate. Among other functions, the water insoluble external phase fluid may function by acting as a semi-permeable membrane for osmotic dehydration of the filter cake and/or by providing additional lubrication, which may assist the freeing of stuck drill string.

In certain embodiments, the water soluble internal phase fluid may comprise any fluid that has a low water activity coefficient, preferably less than about 0.8. Examples of suitable water soluble internal phase fluids include, but are not limited to, brines, diols, triols, and water soluble polyols. Examples of suitable brines useful in the present invention include, but are not limited to, sodium chloride brines, calcium chloride brines, potassium chloride brines, or mixtures thereof. Examples of suitable diols useful in the present invention include, but are not limited to, ethylene glycol, propylene glycol, and other diols of the formula, $R(OH)_2$, where R is any $C_2$ to $C_6$ carbon chain. Examples of triols useful in the present invention include, but are not limited to, glycerin and triols of the formula, $R(OH)_3$, where R is any $C_2$ to $C_6$ carbon chain. The water soluble internal phase fluid may, among other functions, exhibit an osmotic character due to its low water activity coefficient and thus, may assist in the dehydration of filter cake and other material surrounding a drill string.

It is within the skill of a person of ordinary skill in the art with the benefit of this disclosure to determine the optimum ratio of the water insoluble external phase fluid to the water soluble internal phase fluid. To determine the optimum ratio of the water insoluble external phase fluid to the water soluble internal phase fluid, one may vary the ratio of the fluids until a desired rheology is observed.

The ether carboxylic acid emulsifying agent may comprise any suitable ether carboxylic acid. In certain embodiments, the ether carboxylic acid emulsifying agent may be described by Formula 1 below:

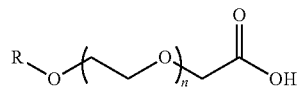

where n is a positive integer: $1 \leq n \leq 8$, and where R comprises any hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, amides, esters, or a mixture thereof. In certain exemplary embodiments, R is $C_{18}H_q$, where q is an integer: $0 \leq q \leq 38$. It is within the knowledge of a person of ordinary skill in the art with the benefit of this disclosure to determine the appropriate amount of emulsifier to add to achieve a desirable emulsion. In certain embodiments, the emulsifying agent may be effective in amount less than about 2% by weight of the spotting fluid composition.

A viscosifier optionally may be added to the spotting fluid composition, among other reasons, to adjust the rheological behavior of the fluid. As the examples below illustrate, the amount of viscosifier may be varied according to the weight of the spotting fluid used to achieve acceptable rheological properties. In certain embodiments, the viscosifier may include clay, organophilic clay, sodium montmorillonite clay, attapulgite clay, high molecular weight biopolymer polysaccharides, cellulose, hydroxyethylcellulose, or a mixture thereof. The amount of viscosifier to add to achieve a desired rheological behavior of the spotting fluid is within the skill of a person of ordinary skill in the art with the benefit of this disclosure.

A weighting agent may optionally be added to the spotting fluid composition, among other reasons, to adjust the density or weight of the fluid. Weighting agents useful in certain embodiments of the present invention include, but are not limited to, barite, bentonite, hematite, hausmannite, ilmenite, calcium carbonate, iron, iron carbonate, or a mixture thereof. The amount of weighting agent to add to achieve a desired density of the spotting fluid is within the skill of a person of ordinary skill in the art with the benefit of this disclosure.

A wetting agent may optionally be added to the spotting fluid composition, among other reasons, to adjust the degree of wetting, otherwise known as "wettability," of the fluid. Wettability refers to the adhesive tension between a liquid and a surface. By modifying the wettability of a spotting fluid, desired performance of the spotting fluid may be obtained. Wetting agents useful in certain embodiments of the present invention include, but are not limited to, lecithin, alkyl sulfonates, alkyl aryl sulfonates, alkyl ammonium salts, alkyl trimethylammonium chlorides, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chlorides, ethoxylated nonyl phenol phosphate esters, cationic surfactants, non-ionic surfactants, alkyl phosphonate surfactants, xylenes, saturated biphenyl-xylene admixtures, heavy aromatic naphthas, heavy aromatic solvents, tetralene, tetrahydroquinoline, tetrahydronaphthalene, or a mixture thereof. The amount of wetting agent to add to achieve a desired wettability of the spotting fluid is within the skill of a person of ordinary skill in the art with the benefit of this disclosure. In certain embodiments, the wetting agent may be present in the spotting fluid composition in an amount of less than about 5% by weight of the spotting fluid composition.

The spotting fluid compositions of the present invention may be used in a variety of methods to address problems related to differential sticking in certain embodiments. In one embodiment of the present invention, a method of reducing drill string sticking comprises providing a spotting fluid composition comprising a water insoluble external phase fluid, a water soluble internal phase fluid, and an ether carboxylic acid emulsifying agent; introducing the spotting fluid to the vicinity of a desired portion of a drill string; and allowing the spotting fluid to interact with a portion of material surrounding the desired portion of the drill string.

The delivery of the spotting fluid to the vicinity of a desired portion of the drill string may be accomplished by a variety of methods known by a person of ordinary skill in the art with the benefit of this disclosure.

One exemplary embodiment of a spotting fluid composition suitable for use with the present invention may be prepared using 60.36% isobutyl oleate by weight of the composition; 37.9% glycerin by weight of the composition; 0.29% by weight of the composition of an oil wetting lecithin-based additive, commercially available under the trademark, DRIL-TREAT® from Baroid Drilling Fluids Corporation, Houston, Tex.; and 1.45% emulsifying agent by weight of the composition where the emulsifying agent is an ether carboxylic acid of the Formula 1:

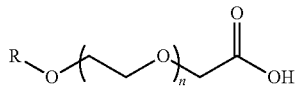

where n is a positive integer: $1 \leq n \leq 8$, and where R is $C_{18}H_q$, where q is an integer: $0 \leq q \leq 38$.

To facilitate a better understanding of the present invention, the following examples of certain embodiments are given. In no way should the following examples be read to limit, or define, the scope of the invention.

EXAMPLES

Various formulations of spotting fluid compositions were prepared at various fluid densities as presented in Tables 1-4 below. The rheological properties of the various formulations prepared were measured, the results of which may be found in Tables 1-4 below.

In each of the Tables 1-4 below, each barrel of Base Spotting Fluid X contained: 0.68 bbl isobutyl oleate, 0.29 bbl of a glycerol, commercially available under the trademark, BAR-ACTIVE® from Baroid Drilling Fluids Corporation, Houston, Tex.; 1 lb DRILTREAT®, and 5 lb emulsifying agent. The emulsifying agent used in Base Spotting Fluid X is an ether carboxylic acid of the formula,

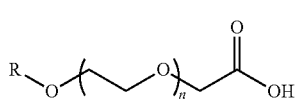

where n is a positive integer: $1 \leq n \leq 8$, and where R is $C_{18}H_q$, where q is an integer: $0 \leq q \leq 38$. The organophilic bentonite clay referenced in Tables 1-4 below is commercially available under the trademark, GELTONE II® from Baroid Drilling Fluids Corporation, Houston, Tex. This organophilic bentonite clay, which imparts viscosity and suspension properties to oil-based drilling fluids, has been treated with an amine compound to promote its dispersion/yield in oils.

TABLE 1

SPOTTING FLUID COMPOSITION I
(AT 12 LB/GAL DENSITY)

| | Sample Mark A | | |
|---|---|---|---|
| Base Spotting Fluid X, bbl | 0.86 | | |
| GELTONE II ®, lbs | 6 | | |
| Barite, lbs | 210 | | |
| Hot rolled @ 150° F., hr | — | 16 | 16 |
| Hot rolled @ 250° F., hr | — | — | 16 |
| Stirred, min | 30 | 15 | 15 |
| Temperature, ° F. | 120 | 120 | 120 |
| Plastic viscosity, cP | 36 | 36 | 38 |
| Yield point, lb/100 ft² | 14 | 12 | 5 |
| 10 Sec gel, lb/100 ft² | 8 | 7 | 5 |
| 10 Min gel, lb/100 ft² | 10 | 8 | 7 |
| Electrical stability, v | 311 | 255 | 389 |
| Fann 35 dial readings | | | |
| 600 rpm | 86 | 84 | 81 |
| 300 rpm | 50 | 48 | 43 |
| 200 rpm | 37 | 36 | 32 |
| 100 rpm | 24 | 22 | 19 |
| 6 rpm | 8 | 8 | 5 |
| 3 rpm | 7 | 6 | 4 |

TABLE 2

SPOTTING FLUID COMPOSITION II
(AT 14 LB/GAL DENSITY)

| | Sample Mark B | | |
|---|---|---|---|
| Base Spotting Fluid X, bbl | 0.78 | | |
| GELTONE II ®, lbs | 4 | | |
| Barite, lbs | 318 | | |
| Hot rolled @ 150° F., hr | — | 16 | 16 |
| Hot rolled @ 250° F., hr | — | — | 16 |
| Stirred, min | 30 | 15 | 15 |
| Temperature, ° F. | 120 | 120 | 120 |
| Plastic viscosity, cP | 47 | 47 | 46 |
| Yield point, lb/100 ft² | 14 | 11 | 10 |
| 10 Sec gel, lb/100 ft² | 8 | 7 | 6 |
| 10 Min gel, lb/100 ft² | 10 | 9 | 7 |
| Electrical stability, v | 322 | 336 | 332 |
| Fann 35 dial readings | | | |
| 600 rpm | 108 | 105 | 102 |
| 300 rpm | 61 | 58 | 56 |
| 200 rpm | 44 | 43 | 40 |
| 100 rpm | 27 | 26 | 24 |
| 6 rpm | 8 | 7 | 6 |
| 3 rpm | 7 | 6 | 5 |

TABLE 3

SPOTTING FLUID COMPOSITION III
(AT 16 LB/GAL DENSITY)

|  | | Sample Mark | |
|---|---|---|---|
|  |  | C |  |
| Base Spotting Fluid X, bbl |  | 0.71 |  |
| GELTONE II ®, lbs |  | 4 |  |
| Barite, lbs |  | 427 |  |
| Hot rolled @ 150° F., hr | — | 16 | 16 |
| Hot rolled @ 250° F., hr | — | — | 16 |
| Stirred, min | 30 | 15 | 15 |
| Temperature, ° F. | 120 | 120 | 120 |
| Plastic viscosity, cP | 75 | 62 | 78 |
| Yield point, lb/100 ft² | 34 | 50 | 50 |
| 10 Sec gel, lb/100 ft² | 14 | 11 | 13 |
| 10 Min gel, lb/100 ft² | 18 | 12 | 15 |
| Electrical stability, v | 620 | 595 | 779 |
| Fann 35 dial readings | | | |
| 600 rpm | 184 | 174 | 206 |
| 300 rpm | 109 | 112 | 128 |
| 200 rpm | 81 | 75 | 97 |
| 100 rpm | 51 | 46 | 61 |
| 6 rpm | 16 | 12 | 15 |
| 3 rpm | 14 | 10 | 12 |

TABLE 4

SPOTTING FLUID COMPOSITION IV
(AT 18 LB/GAL DENSITY)

|  | | Sample Mark | |
|---|---|---|---|
|  |  | D |  |
| Base Spotting Fluid X, bbl |  | 0.63 |  |
| GELTONE II ®, lbs |  | 2 |  |
| Barite, lbs |  | 537 |  |
| Hot rolled @ 150° F., hr | — | 16 | 16 |
| Hot rolled @ 250° F., hr | — | — | 15 |
| Stirred, min | 30 | 15 | 15 |
| Temperature, ° F. | 150 | 150 | 150 |
| Plastic viscosity, cP | 92 | 92 | 81 |
| Yield point, lb/100 ft² | 46 | 52 | 39 |
| 10 Sec gel, lb/100 ft² | 14.5 | 13 | 8 |
| 10 Min gel, lb/100 ft² | 18 | 16 | 9 |
| Electrical stability, v | 978 | 1030 | 1394 |
| Fann 35 dial readings | | | |
| 600 rpm | 230 | 236 | 201 |
| 300 rpm | 138 | 144 | 120 |
| 200 rpm | 104 | 110 | 90 |
| 100 rpm | 65 | 68 | 53 |
| 6 rpm | 16 | 15 | 9 |
| 3 rpm | 14 | 12 | 6 |

Tables 1-4 show that each of the various formulations possess desirable rheological properties at each of the respective formulation densities.

Thus, the present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method of reducing drill string sticking comprising:
providing a spotting fluid composition comprising a water insoluble external phase fluid, a water soluble internal phase fluid, and an ether carboxylic acid emulsifying agent;
introducing the spotting fluid to the vicinity of a desired portion of a drill string, such that the spotting fluid comes into contact with a portion of material surrounding the desired portion of the drill string; and
allowing the spotting fluid to interact with the portion of material surrounding the desired portion of the drill string.

2. The method of claim 1 wherein the ether carboxylic acid emulsifying agent is defined by the following formula:

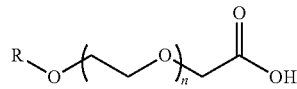

where n is a positive integer: $1 \leq n \leq 8$, and where R is any hydrocarbon group having from about 1 to about 30 carbon atoms.

3. The method of claim 2 wherein the water insoluble external phase fluid comprises at least one of the following: a fatty acid ester, a mineral oil, a linear alpha olefin, an internal olefin, an n-paraffin, diesel oil, kerosene, methyl oleate, ethyl oleate, isobutyl oleate, isobutyl linoleate, isobutyl linolenate, and any mixture thereof.

4. The method of claim 3 wherein the water soluble internal phase fluid comprises glycerin.

5. The method of claim 3 wherein the water soluble internal phase fluid comprises a fluid with a water activity coefficient less than about 0.8.

6. The method of claim 3 wherein the water soluble internal phase fluid comprises at least one of the following: glycerin, a brine, a diol, a triol, a water soluble polyol, a sodium chloride brine, a calcium chloride brine, a potassium chloride brine, ethylene glycol, propylene glycol, and any mixture thereof.

7. The method of claim 2 wherein the spotting fluid composition further comprises a viscosifier.

8. The method of claim 7 wherein the viscosifier comprises at least one of the following: a clay, an organophilic clay, a sodium montmorillonite clay, an attapulgite clay, a high molecular weight biopolymer polysaccharide, cellulose, hydroxyethylcellulose, and any mixture thereof.

9. The method of claim 2 wherein the spotting fluid composition further comprises a weighting agent.

10. The method of claim 9 wherein the weighting agent comprises at least one of the following: barite, bentonite, hematite, hausmannite, ilmenite, calcium carbonate, iron, iron carbonate, and any mixture thereof.

11. The method of claim 2 wherein the spotting fluid composition further comprises a wetting agent.

12. The method of claim 11 wherein the wetting agent comprises at least one of the following: lecithin, an alkyl sulfonate, an alkyl aryl sulfonate, an alkyl ammonium salt, an alkyl trimethylammonium chloride, a branched alkyl ethoxylated alcohol, a phenol-formaldehyde nonionic resin blend, a cocobetaine, dioctyl sodium sulfosuccinate, an imidazoline, an alpha olefin sulfonate, a linear alkyl ethoxylated alcohol, a trialkyl benzylammonium chloride, an ethoxylated nonyl phenol phosphate ester, a cationic surfactant, a non-ionic surfactant, an alkyl phosphonate surfactant, a xylene, a saturated biphenyl-xylene admixture, a heavy aromatic naphtha, a heavy aromatic solvent, tetralene, tetrahydroquinoline, tetrahydronaphthalene, and any mixture thereof.

13. The method of claim 2 wherein R is $C_{18}H_q$, where q is an integer: $0 \leq q \leq 38$.

14. The method of claim 2 wherein the water soluble internal phase fluid comprises glycerin.

15. The method of claim 2 wherein the water soluble internal phase fluid comprises at least one of the following: glycerin, a brine, a diol, a triol, a water soluble polyol, a sodium chloride brine, a calcium chloride brine, a potassium chloride brine, ethylene glycol, propylene glycol, and any mixture thereof.

16. The method of claim 1 wherein the water soluble internal phase fluid comprises at least one of the following: glycerin, a brine, a diol, a triol, a water soluble polyol, a sodium chloride brine, a calcium chloride brine, a potassium chloride brine, ethylene glycol, propylene glycol, and any mixture thereof.

17. The method of claim 16 wherein the water insoluble external phase fluid comprises at least one of the following: a fatty acid ester, a mineral oil, a linear alpha olefin, an internal olefin, an n-paraffin, diesel oil, kerosene, methyl oleate, ethyl oleate, isobutyl oleate, isobutyl linoleate, isobutyl linolenate, and any mixture thereof.

18. The method of claim 1 wherein the water insoluble external phase fluid comprises at least one of the following: a fatty acid ester, a mineral oil, a linear alpha olefin, an internal olefin, an n-paraffin, diesel oil, kerosene, methyl oleate, ethyl oleate, isobutyl oleate, isobutyl linoleate, isobutyl linolenate, and any mixture thereof.

19. A method of reducing differential sticking of a drill string comprising:
providing a spotting fluid composition comprising an emulsion formed by the reaction product of a water insoluble external phase fluid wherein the water insoluble external phase fluid comprises isobutyl oleate, a water soluble internal phase fluid wherein the water soluble internal phase fluid comprises glycerin, an ether carboxylic acid emulsifying agent wherein the ether carboxylic acid is defined by the following formula:

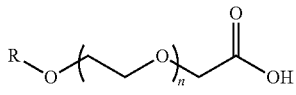

where n is a positive integer: $1 \leq n \leq 8$, and where R is any hydrocarbon group having from about 1 to about 30 carbon atoms;
introducing the spotting fluid composition to the vicinity of a desired portion of a drill string such that the spotting fluid comes into contact with a portion of material surrounding the desired portion of the drill string; and
allowing the spotting fluid to interact with the portion of material surrounding a desired portion of the drill string.

20. A method of reducing differential sticking of a drill string comprising:
providing a spotting fluid comprising
a water insoluble external phase fluid wherein the water insoluble external phase fluid comprises isobutyl oleate,
a water soluble internal phase fluid wherein the water soluble internal phase fluid comprises glycerin,
an ether carboxylic acid emulsifying agent wherein the ether carboxylic acid is defined by the following formula:

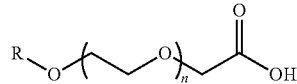

where n is a positive integer: $1 \leq n \leq 8$, and where R is $C_{18}H_q$, where q is an integer: $0 \leq q \leq 38$,
a viscosifier wherein the viscosifier comprises organophilic clay,
a weighting agent wherein the weighting agent comprises barite, and
a wetting agent wherein the wetting agent comprises lecithin;
introducing the spotting fluid composition to the vicinity of a desired portion of a drill string such that the spotting fluid comes into contact with a portion of material surrounding the desired portion of the drill string; and
allowing the spotting fluid to interact with the portion of material surrounding a desired portion of the drill string.

* * * * *